United States Patent

[11] 3,532,169

[72] Inventors Cornelis van der Lely
7 Bruschenrain, Zug, Switzerland;
Ary van der Lely, 10 Weverskade,
Maasland, Netherlands
[21] Appl. No. 590,790
[22] Filed Oct. 31, 1966
[45] Patented Oct. 6, 1970
[32] Priority Nov. 16, 1965
[33] Netherlands
[31] 6514841 and 6514842

[54] CULTIVATING IMPLEMENTS
15 Claims, 11 Drawing Figs.
[52] U.S. Cl. ................................................ 172/32, 172/113
[51] Int. Cl. ........................................................ A01b 17/00
[50] Field of Search ........................................ 172/32, 39, 112, 113, 123, 701, 117; 171/4, 6

[56] References Cited
UNITED STATES PATENTS

| 996,998 | 7/1911 | Muggli | 172/32 |
| 1,676,646 | 7/1928 | Funk | 172/123X |
| 2,473,770 | 6/1949 | Seaman | 172/117X |
| 3,029,879 | 4/1962 | Wells | 172/112X |
| 3,294,046 | 12/1966 | Boots | 171/6X |

FOREIGN PATENTS

| 674,769 | 7/1952 | Great Britain | 172/39 |

Primary Examiner—Robert E. Pulfrey
Assistant Examiner—James W. Peterson
Attorney—Mason, Mason and Albright ABSTRACT: A cultivating implement with a plurality of rotatable soil-working members mounted on a movable frame. One or more guide members are mounted adjacent the soil-working members to guide displaced soil into ridge-like configurations.

INVENTORS
CORNELIS VAN DER LELY
ARY VAN DER LELY
BY
Mason, Mason & Albright
Attorneys Patented Oct. 6, 1970

3,532,169

Sheet 3 of 4

INVENTORS
CORNELIS VAN DER LELY
ARY VAN DER LELY
BY
Mason, Mason & Albright
Attorneys

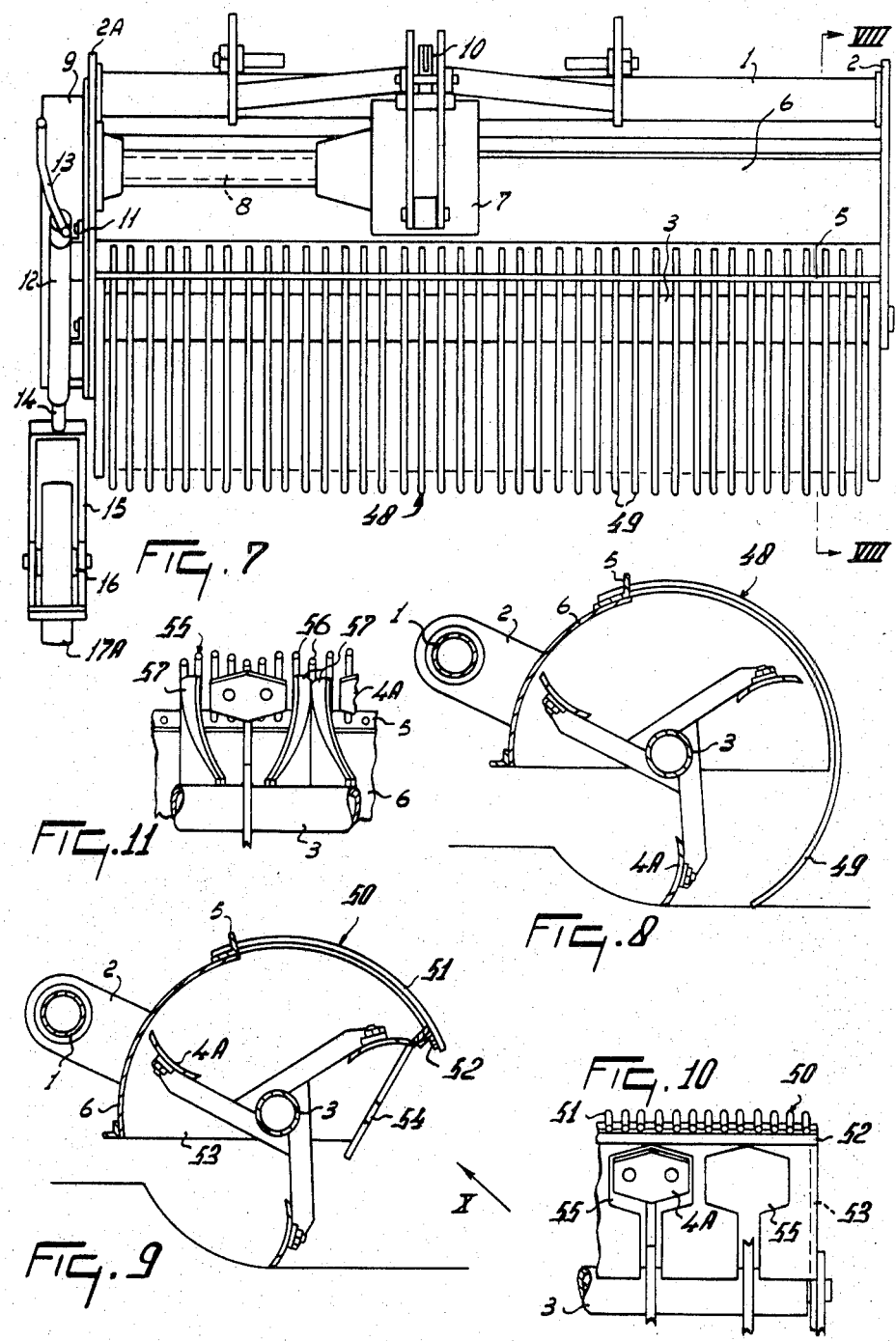

CULTIVATING IMPLEMENTS

Objects of the invention include the provision of implements by which a field of soil can be prepared for "wintering" in a simple manner so that, in the following spring, the soil is quite finely divided and requires little further work before spring sowings can be made.

Figure 1:
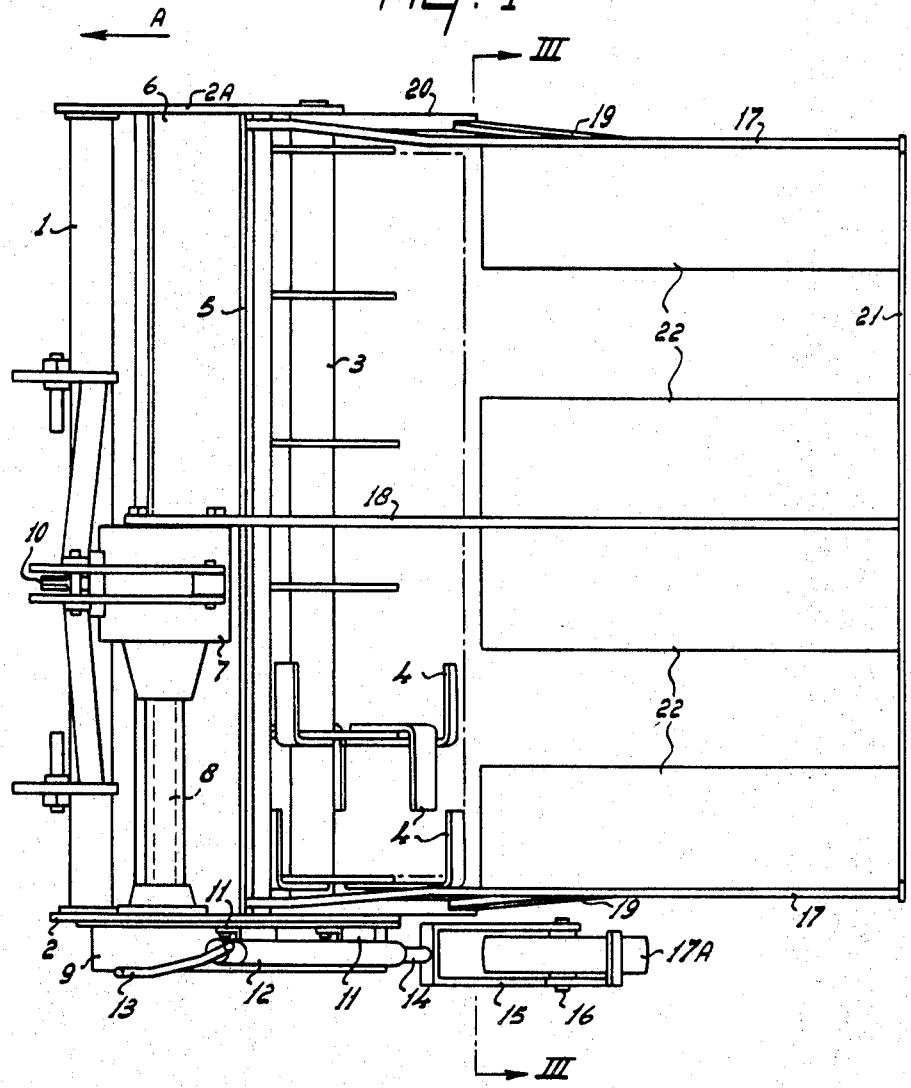
Figure 2:
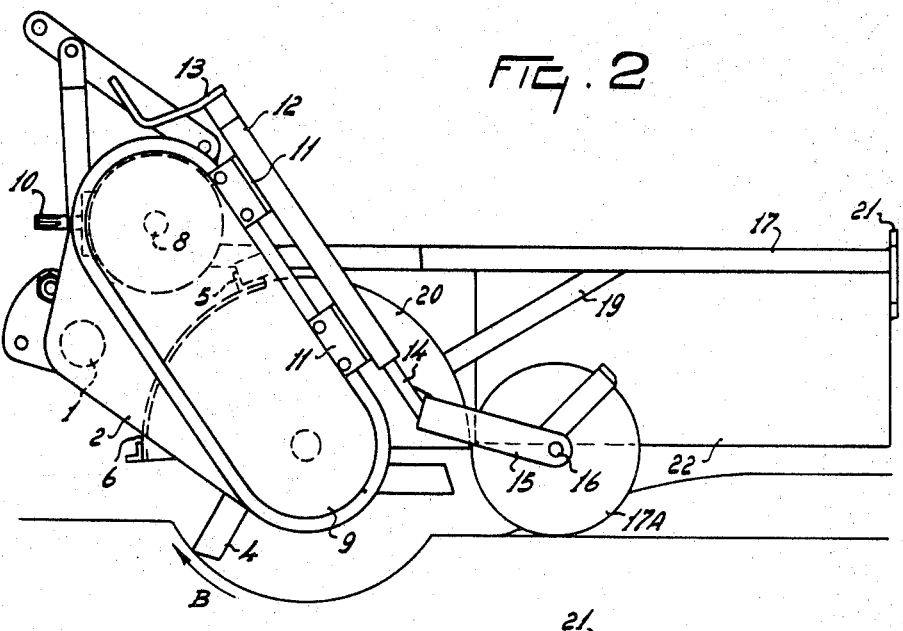
Figure 3:
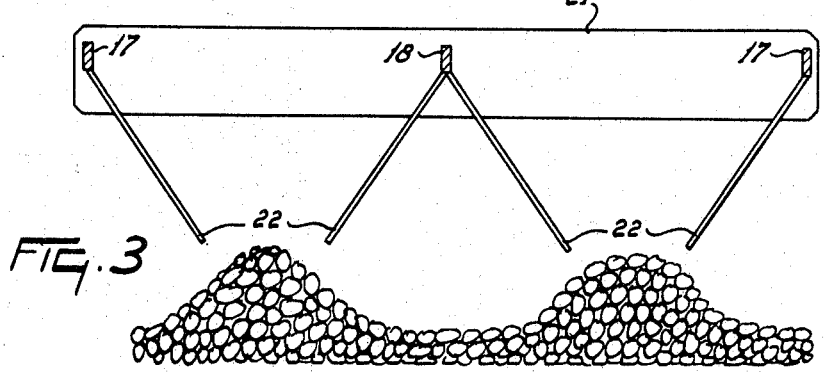
Figure 4:
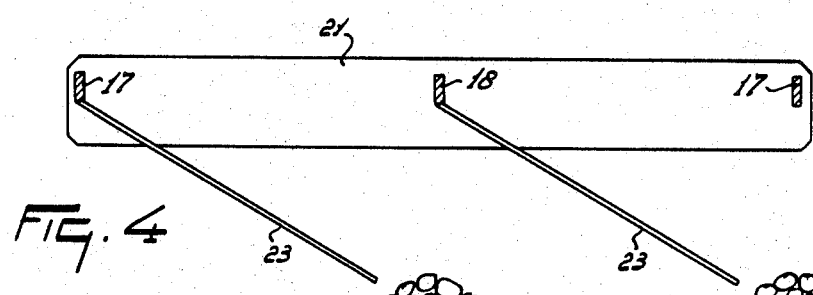

For a better understanding of the invention, and to show how the same may be carried into effect, reference will now be made, by way of example, to the accompanying drawings, in which:

FIG. 1 is a plan view of a cultivating implement in accordance with the invention, FIG. 2 is a side elevation showing the implement of FIG. 1 in operation, FIG. 3 is a section taken on the line III–III of FIG. 1, FIG. 4 corresponds to FIG. 3 but shows the implement provided with alternative parts.

Figure 5:
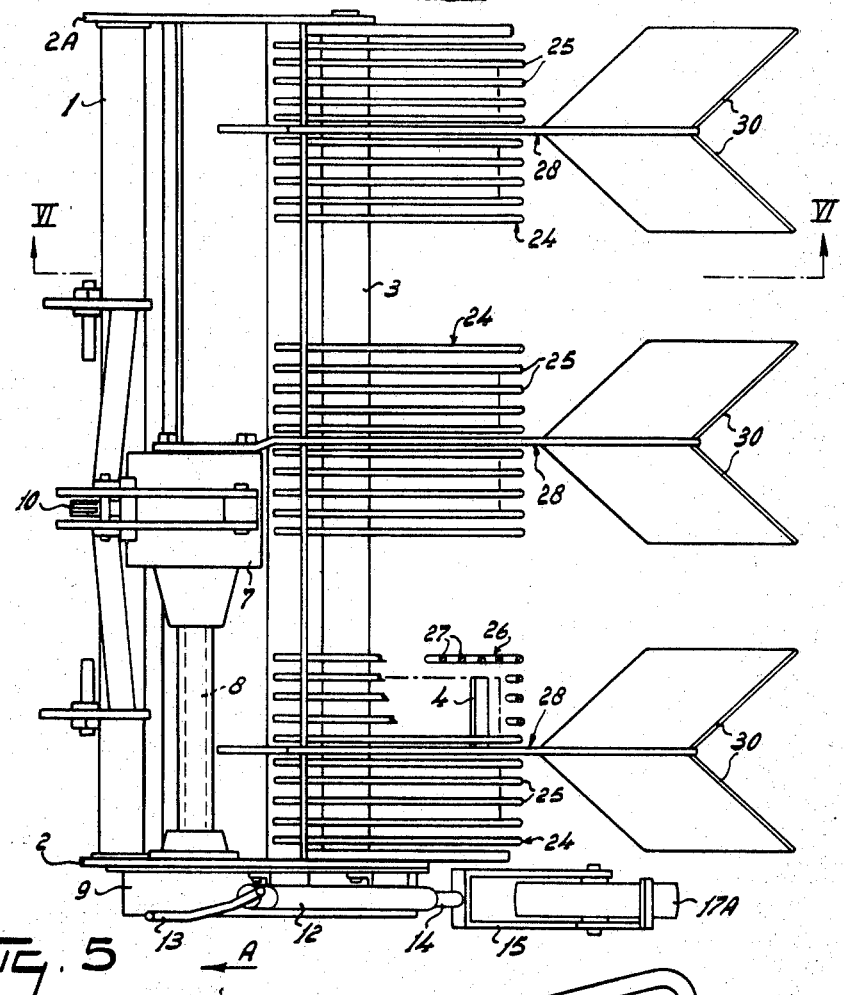
Figure 6:
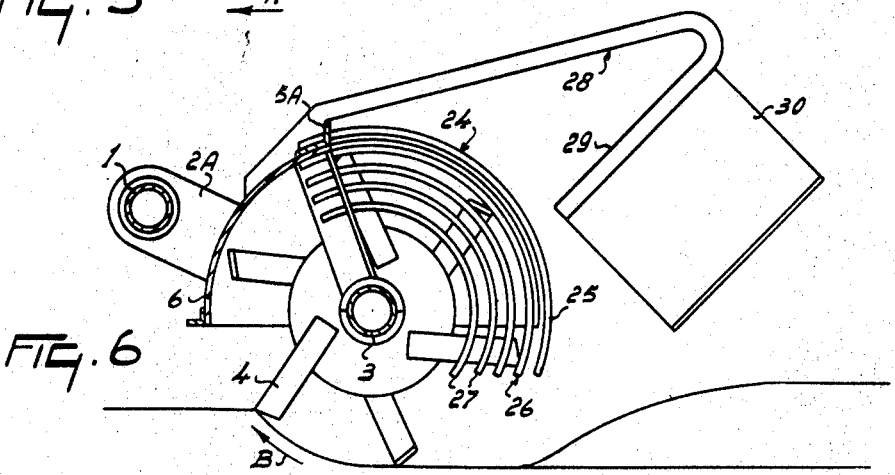

FIG. 5 is a plan view of a second embodiment of a cultivating implement in accordance with the invention, FIG. 6 is a side elevation corresponding to FIG. 5 and showing the implement in operation, FIG. 7 is a plan view of a third embodiment of a cultivating implement in accordance with the invention, FIG. 8 is a section taken on the line VIII–VIII of FIG. 7, FIG. 9 corresponds to FIG. 8 but shows an alternative construction of certain parts, FIG. 10 is a scrap view as seen in the direction indicated by the arrow X of FIG. 9, and FIG. 11 corresponds generally to FIG. 10 but shows an alternative construction of certain parts.

Referring to FIGS. 1 to 4 of the drawings, the cultivating implement which is illustrated has a frame beam 1 which extends horizontally perpendicular to the intended direction of travel of the implement which is indicated by the arrow A in FIG. 1. Triangular plates 2 and 2A that are contained in vertical planes parallel to the direction A are secured to opposite ends of the frame beam 1 so as to extend generally rearwardly of the direction A from said beam 1. Lowermost regions of the two plates 2 and 2A support a rotary shaft 3 that extends parallel to the frame beam 1. The shaft 3 extends between the two plates 2 and 2A and carries, at regular intervals along its length, soil-working members in the form of hook-shaped blades 4.

A bar 5 of L-shaped cross section extends parallel to the frame beam 1 and interconnects central regions of the two plates 2 and 2A. A hood-shaped baffle which is generally indicated by the reference numeral 6 is fastened to the bar 5 and extends between the two plates 2 and 2A in such a way as to lie over and above and in partially surrounding relationship with the shaft 3 and the blades 4 that are carried thereby. The baffle 6 extends downwardly and forwardly from the bar 5 relative to the direction A (see FIG. 2), said baffle having the shape of a segment of the curved surface of a hollow circular cylinder, the center of curvature of said segment substantially coinciding with the longitudinal axis of the shaft 3 and subtending an angle of less than 90° at that axis.

A gear box 7 is fastened to the frame beam 1 approximately midway along the length of the latter and has a rotary output shaft 8 extending parallel to the frame beam 1. The end of the output shaft 8 which is remote from the gear box 7 is in driving connection with the rotary shaft 3 by way of a chain and sprocket or like transmission located within a casing 9. The gear box 7 also has a splined rotary input shaft 10 which projects forwardly from it in a direction parallel to the direction A. This shaft is intended to be placed in driven connection with the power takeoff shaft of an agricultural tractor or other vehicle by way of an intermediate transmission shaft of known construction having universal joints at its opposite ends. As will be evident from FIGS. 1 and 2 of the drawings, the leading side of the implement is provided with parts that are intended to co-operate with the lifting links of the three-point lifting device carried by an agricultural tractor or other vehicle.

The rearmost edge, relative to the direction A, of the casing 9 has a tubular guide 12 connected to it by two spaced supporting lugs 11. A screw-threaded spindle 13, the operating handle of which can be seen in FIGS. 1 and 2 of the drawings, is located in the guide 12 and is arranged to cooperate in extending and retracting manner with a screw-threaded portion of a tube 14, said portion being located within the guide 12. The lowermost projecting end of the tube 14 is fastened to the web of a forked bracket 15 whose limbs project approximately horizontally rearwardly from said web. A horizontal axle 16 is mounted between the free ends of the limbs of the bracket 15 and a ground wheel 17A is rotatably carried by said axle.

Substantially horizontal beams 17 project rearwardly from the bar 5 in a direction parallel to the direction A from locations very close to the opposite ends of said bar 5, both the beams 17 being located between the two plates 2 and 2A. A further relatively parallel substantially horizontal beam 18 that is located midway between the two beams 17 projects rearwardly from the gear box 7, the leading end of the beam 18 being bolted to one side of said gear box. Vertical plates 20 that are secured to the two plates 2 and 2A assist in supporting the beams 17 through the intermediary of inclined struts 19. The rearmost extremities of the two beams 17 and single beam 18 are all interconnected by a plate 21 which is contained in a substantially vertical plane and which extends parallel to the frame beam 1. The parts 17, 18 and 21 afford a supporting structure for soil guide members in the form of four plates 22. Each plate 22 is of oblong shape, the longer sides of the plates extending substantially perpendicular to the axis of rotation of the shaft 3 over a distance which is not less than the diameter of a cylindrical surface containing the radially outermost points (relative to the shaft 3) of all the blades 4. It will be apparent from FIG. 3 of the drawings that each of the beams 17 carries one plate 22 while the beam 18 carries two plates 22 and that the four plates are arranged in two groups in each of which groups the corresponding two plates occupy a V-shaped relationship to each other when seen in a direction parallel to the direction A (FIG. 3). Thus, two funnel-shaped openings are formed between the lowermost ends of the two pairs of plates 22.

In the use of the rotary cultivating implement which has been described, its leading side is connected to the three-point lifting device of an agricultural tractor or other suitable vehicle and the rotary input shaft 10 is placed in driven connection with the power takeoff shaft of the same tractor or other vehicle with the aid of the aforementioned intermediate transmission shaft of known construction. The input shaft 10 transmits drive by way of the gear box 7, output shaft 8 and transmission located within the casing 9 to the shaft 3 which is rotated in the direction indicated by the arrow B in FIG. 2 of the drawings so that the blades 4 move forwardly over the ground relative to the direction A. As the tractor or other vehicle moves the whole implement over the ground in the direction A, the blades 4 cut into the surface of the soil in the manner illustrated in FIG. 2 to a depth which is controlled by the degree of extension of the tube 14 from the guide 12. The soil displaced by the blades 4 is carried upwardly and rearwardly beneath the baffle 6 and is thrown into the region of the guide members afforded by the plates 22. The displaced soil is guided by the plates 22 in such a way that it falls to the ground through the funnel-shaped openings formed between said plates in approximately the way indicated in FIG. 3 of the drawings. The displaced soil is thus left lying as a series of relatively spaced ridges. This manner of working the ground is particularly suitable for use in the autumn or fall of the year since it forms a coarsely crumbled soil consistency whose area of exposure to the air is increased by the ridges. The loose lumps of soil are thus fully exposed to winter frost so that, by the following spring they have become well broken. The plate 21 acts to prevent lumps of soil from being thrown rearwardly of the implement beyond the guide plates 22.

FIG. 4 shows an alternative construction in which the four guide plates 22 are replaced by two larger guide plates 23. It will be evident from FIG. 4 that, once again, the guide plates 23 act to deposit the displaced soil on the ground in the form of relatively spaced ridges that extend parallel to the direction A.

The cultivating implement which is illustrated in FIGS. 5 and 6 of the drawings is basically similar to the implement of FIGS. 1 to 3 and, therefore, those parts which are similar, or identical, to parts which have already been described are designated by the same reference numerals as are used in FIGS. 1 to 3. In this case, the hook-shaped blades 4 are fastened to the rotary shaft 3 in three separate groups. This may be achieved by, for example, removing intermediate blades 4 from the shaft 3 illustrated in FIGS. 1 and 2. The bar 5 is replaced by a bar 5A which is of angular, but not right-angled, cross section (see FIG. 6). The bar 5A carries three baffles 24 each of which is arranged to cooperate with a corresponding one of the groups of blades 4. Each baffle 24 is formed from a plurality of spring steel rods 25 that are of curved configuration with the centers of curvature substantially coinciding with the axis of rotation of the shaft 3. Each rod 5 is contained in a vertical plane that is substantially perpendicular to the axis just mentioned. In addition, at each of its sides, each baffle 24 is associated with a corresponding screen 26 formed from a plurality of spring steel rods 27 which are curved so that their centers of curvature substantially coincide with the axis of rotation of the shaft 3. As can be seen in FIGS. 5 and 6 of the drawings, the rods 27 are of differing curvatures and are arranged at different distances from the axis which has just been mentioned but all concentric with that axis.

Three beams 28, corresponding to the three groups of blades 4, project rearwardly and gently upwardly from the baffle 6 and from one side of the gear box 7 in the case of the central beam 28. The end of each beam 28 remote from the baffle 6 or gear box 7 takes the form of a portion 29 which is bent over so as to project downwardly and forwardly from its junction with the remainder of the corresponding beam 28. Each portion 29 supports two soil guide members in the form of oblong plates 30, each pair of plates being in inverted V-shaped relationship when seen in a direction parallel to the longitudinal axis of the corresponding portion 29. The apex of the V is contained in a substantially vertical plane that is parallel to the intended direction of travel A and that contains the center of the corresponding group of blades 4.

In the use of the cultivating implement illustrated in FIGS. 5 and 6 of the drawings, it is coupled to, and powered by, an agricultural tractor or other vehicle in the manner described with reference to FIGS. 1 to 4. The shaft 3 is rotated in the direction indicated by the arrow B in FIG. 6 of the drawings and, if desired, the transmission to said shaft may include means (not shown) for obtaining different speeds of rotation of the shaft for a constant speed of rotation of the input shaft 10. Soil displaced by the blades 4 is carried upwardly and rearwardly beneath the baffle 6 at the rearmost edge of which it meets the rods 25. Loose, finely divided soil passes easily between the rods 25 before it falls to the ground. The plates 30 act to cause this soil to fall to the ground in the form of ridges which extend parallel to the direction A. Unbroken lumps of soil together with agricultural debris such as stones, roots, pieces of wood and the like will not pass between the rods 25 or between the rods 27 and are thus carried round with the blades 4 to the rearmost ends of said rods where they fall directly to the ground and are left lying in the furrows formed between the aforementioned ridges of finely divided soil. The ridges which are formed in this way are particularly suitable for growing crops such as potatoes.

If desired, the baffles 24 and corresponding screens 26 may be detachably mounted on the implement so that they can be replaced by a single baffle extending throughout the working width of the implement. Blades 4 can then be mounted on the shaft 3 throughout the length of the latter in the manner described with reference to FIG. 1. Alternatively, means (not illustrated) may be provided for varying the spacing between the groups of blades 4, the baffles 24 and screens 26 and the plates 30. The spacings between the ridges of soil which are formed by the implement can thus be readily adjusted.

FIGS. 7 and 8 of the drawings illustrate a cultivating implement which is once again basically similar to the implement described with reference to FIGS. 1 to 4. Accordingly, parts that are similar, or identical, to parts which have already been described are designated by the same reference numerals as are used in the preceding figures. The bar 5 carries a perforated baffle 48 formed by a plurality of spring steel rods 49 each of which is curved so that its center of curvature coincides with the longitudinal axis of the shaft 3. As can be seen in FIG. 7 of the drawings, the rods 49 are contained in substantially vertical planes that are regularly spaced apart from one another throughout the working width of the implement. It will be apparent from FIG. 8 of the drawings that the ends of the rods 49 that are remote from the bar 5 are located at ground level within the cavity which is formed by the blades 4A (see FIGS. 10 and 11) mounted on the shaft 3. The spacing of the rods 49 from the shaft 3 is such that, during rotation of that shaft, the radially outermost points of the blades 4A move very close to said rods.

In the use of the implement which has been described with reference to FIGS. 7 and 8 of the drawings, any lumps of soil or other agricultural debris too large to pass between the perforations of the baffle 48 are carried around the shaft 3 with the blades 4A so that, in the case of lumps of soil, said lumps eventually become sufficiently crumbled to pass between the rods 49 or, in the case of stones and the like, these eventually pass between the rods 49 towards the free ends thereof since the resiliency of said rods is sufficient to allow them to deflect temporarily for this purpose. The repeated treatment of stubborn lumps of soil enhances the efficiency of the implement in regard to its crumbling effect upon the soil.

FIGS. 9 and 10 of the drawings illustrate a modification of various parts that are illustrated in FIGS. 7 and 8. The perforated baffle 48 is replaced by a perforated baffle 50 formed from rods 51 which are similar to the rods 49 except that they are of much shorter length. In fact, each curved rod 51 subtends an angle of approximately 90° at the axis of rotation of the shaft 3. The lowermost and rearmost ends of the rods 51 are interconnected by a bar 52 of approximately L-shaped cross section, said bar 52 extending parallel to the shaft 3 between vertical end plates 53 located at the opposite ends of the shaft 3. The bar 52 supports a profiled guide 54 which is inclined forwardly and downwardly from the bar 52 in a direction generally, but not strictly, towards the shaft 3. As can be seen in FIG. 10 of the drawings, the guide 54 is formed with a plurality of openings 55 matching the shapes of the blades 4A so that said blades can pass through the openings during rotation of the shaft 3. The guide 54 can thus extend from the bar 52 to a location close to the shaft 3.

In the modification illustrated in FIGS. 9 and 10 of the drawings, the guide 54 affords the means for ensuring that lumps of soil which are not broken up by their first contact with the blades 4A are recirculated by said blades until crumbling occurs. Sufficiently crumbled soil passes between the rods 51 and falls to the ground in a finely divided condition which affords a good seed bed.

In the modification of FIG. 11, each blade 4A has its own individual soil guide members. It will be noted that the blades 4A are spaced apart from one another along the shaft 3 by a greater distance than in the embodiment illustrated in FIG. 10. Perforated baffles are provided and each of them is afforded principally by curved spring steel guide rods 56. However, in this case, the spacings of the successive rods 56 from the shaft 3 progressively increase to either side of a plane of symmetry of each blade 4A that is perpendicular to the shaft 3. This arrangement tends to ensure that a nonbroken lump of soil is guided away from one or other side of each of the planes of symmetry that have just been mentioned. The opposite sides of each perforated baffle meet curved guide plates 57 which converge towards the shaft 3 and thus return unbroken lumps of soil for recirculation by the blades 4A.

We claim:

1. A cultivating implement comprising a frame, a shaft rotatably supported by said frame, a plurality of soil-working elements mounted on said shaft to be movable forwardly through the ground relative to the direction of travel of said implement, said shaft being partly surrounded by a baffle which is positioned forwardly of said shaft, guide members supported on said implement to the rear of and adjacent to the path of said soil-working members with the lowermost forward edges of said guide members being substantially level with said shaft, said guide members supported by said frame to present surfaces which extend at an angle inclined to the vertical whereby soil is initially displaced forwardly and then over said shaft to the rear thereof to be guided by the inclined surfaces of said guide elements before falling on the ground in ridges.

2. An implement as claimed in claim 1, wherein said guide members are arranged in at least two groups, the guide members in each group being arranged in V-shaped formation.

3. An implement as claimed in claim 1, wherein said guide members are elongated and substantially straight plates mounted to be nonparallel to said shaft.

4. An implement as claimed in claim 3, wherein each plate has a length at least equal to the diameter defined by the path of said soil-working elements.

5. An implement as claimed in claim 1, wherein said baffle subtends an angle of less than 90° at the axis of rotation of said shaft.

6. An implement as claimed in claim 1, wherein a perforated baffle is mounted between said shaft and said guide members whereby soil contacting said guide members first passes through the apertures in said perforated baffle.

7. A cultivating implement comprising a frame, a shaft rotatably mounted in said frame, a plurality of soil-working members on said shaft and guide means for guiding soil displaced by said soil-working members, a perforated baffle being positioned between said rotary shaft and said guide means whereby, during use of the implement, soil which contacts said guide members must first pass through the apertures in said perforated baffle, said soil-working members being in groups, each of said groups being flanked on each side by a screen extending substantially perpendicular to said shaft.

8. An implement as claimed in claim 7, wherein each screen is comprised principally by an assembly of curved rods whose centers of curvature substantially coincide with the longitudinal axis of said shaft.

9. A cultivating implement comprising a frame, a shaft rotatably mounted in said frame and a plurality of soil-working elements mounted on said shaft to be movable forwardly through the ground relative to the direction of travel of said implement, guide members supported on said implement for guiding soil displaced by said soil-working elements to the rear thereof, curved, perforated baffle means being mounted between said shaft and said guide members, whereby soil is initially displaced forwardly and then over said shaft to pass through perforations in said baffle means before contacting said guide members, said guide members being positioned adjacent said perforated baffle means, whereby the edges of said guide members closest to said baffle means are located at a lower level than the edges of said guide members remote from said baffle means.

10. An implement as claimed in claim 9, wherein said soil-working elements are mounted on said shaft in at least three relatively spaced groups.

11. An implement as claimed in claim 10, wherein each group of said soil-working elements is associated with a corresponding pair of guide members for guiding displaced soil, each pair of guide members being arranged in inverted V-shaped relationship, whereby the apex of the V is substantially coplanar with the center of a corresponding group of soil-working members.

12. An implement as claimed in claim 9, wherein said soil-working elements are in groups and each group of soil-working elements is provided with its respective perforated baffle.

13. An implement as claimed in claim 9, wherein said baffle means is comprised of an assembly of rods, said rods being of curved configuration within their centers of curvature substantially coinciding with the axis of rotation of said shaft.

14. An implement as claimed in claim 9, wherein said soil-working elements are in groups and each of said groups is flanked on each side of a screen, said screen extending substantially perpendicular to said shaft.

15. An implement as claimed in claim 14, wherein each screen is comprised of an assembly of curved rods with their centers of curvature coinciding with the longitudinal axis of said shaft.